United States Patent [19]

Moylan

[11] 3,912,914

[45] Oct. 14, 1975

[54] PROGRAMMABLE SWITCHING ARRAY

[75] Inventor: Philip John Moylan, Holmdel, N.J.

[73] Assignee: Bell Telephone Laboratories, Incorporated, Murray Hill, N.J.

[22] Filed: Dec. 26, 1972

[21] Appl. No.: 318,626

[52] U.S. Cl. .................. 235/152; 307/207; 329/92

[51] Int. Cl.$^2$ ...................... G06F 7/38; H03K 19/20

[58] Field of Search ............ 235/152; 307/203, 207; 328/92

[56] References Cited

UNITED STATES PATENTS

| | | | |
|---|---|---|---|
| 3,400,379 | 9/1968 | Harman | 307/207 X |
| 3,619,583 | 11/1971 | Arnold | 307/203 X |
| 3,731,073 | 5/1973 | Moylan | 235/152 |

*Primary Examiner*—Charles E. Atkinson
*Assistant Examiner*—J. F. Gottman
*Attorney, Agent, or Firm*—R. A. Ryan

[57] ABSTRACT

A method and apparatus are disclosed for programming a fixed array of identical logic modules to generate an arbitrary sequential switching function. In particular, an array is provided which includes an ordered arrangement of columns of modules, each module having a plurality of input leads and at least one output lead. By completing electrical paths between the output leads of selected ones of the modules in a given column with the inputs of modules in the adjacent column, the array is tailored to produce the desired function. The connections are specified by an interconnection algorithm which is based on factors of the desired switching function and which is chosen to eliminate crossovers among the connecting paths.

4 Claims, 9 Drawing Figures

FLOW TABLE

| | X | | |
|---|---|---|---|
| | 0 | 1 | Z |
| 1 | 2 | 1 | 0 |
| 2 | 3 | 1 | 0 |
| 3 | 4 | 1 | 1 |
| 4 | 4 | 5 | 1 |
| 5 | 2 | 1 | 1 |

INFORMATION FLOW TABLE

| | X | | |
|---|---|---|---|
| | 0 | 1 | |
| 12345 | 234 | 15 | BLOCK 0 |
| 234 | 34 | 15 | BLOCK 1 |
| 15 | 2 | 1 | |
| 34 | 4 | 15 | BLOCK 2 |
| 15 | 2 | 1 | |
| 2 | 3 | 1 | |
| 1 | 2 | 1 | |
| 4 | 4 | 5 | BLOCK 3 |
| 15 | 2 | 1 | |
| 2 | 3 | 1 | |
| 1 | 2 | 1 | |
| 3 | 4 | 1 | |

FLOW TABLE

| | X | | Z | f |
|---|---|---|---|---|
| | 0 | 1 | | |
| 1 | 4 | 4 | 1 | 0 |
| 2 | 2 | 3 | 0 | 1 |
| 3 | 4 | 2 | 0 | 0 |
| 4 | 1 | 5 | 1 | 1 |
| 5 | 4 | 3 | 1 | 1 |

INFORMATION FLOW TABLE

| | X f | | | | |
|---|---|---|---|---|---|
| | 00 | 01 | 11 | 10 | |
| 12345 | 4 | 124 | 35 | 24 | BLOCK 0 |
| 4 | - | 1 | 5 | - | |
| 124 | 4 | 12 | 35 | 4 | BLOCK 1 |
| 35 | 4 | 4 | 3 | 2 | |
| 24 | - | 12 | 35 | - | |
| 1 | 4 | - | - | 4 | |
| 5 | - | 4 | 3 | - | |
| 4 | - | 1 | 5 | - | |
| 12 | 4 | 2 | 3 | 4 | BLOCK 2 |
| 35 | 4 | 4 | 3 | 2 | |
| 3 | 4 | - | - | 2 | |
| 2 | - | 2 | 3 | - | |

PROGRAMMABLE SWITCHING ARRAY

RELATED CASE

The present application is related to a copending application, Ser. No. 241,267, filed by P. J. Moylan on Apr. 5, 1972 and assigned to the assignee of the instant invention. The matter included in the cited copending application is hereby incorporated by reference into the instant application.

1. Field of the Invention

This invention relates to logic function generating circuits. More particularly, the present invention relates to iterative arrays of substantially identical modules for realizing an arbitrary sequential switching function. Still more particularly the present invention relates to apparatus and methods for interconnecting a plurality of substantially identical switching circuit modules arranged in a two-dimensional array where the interconnecting paths are placed in such a manner as to eliminate crossovers.

2. Background and Prior Art

Switching circuits have long been used in various mechanical and electromechanical forms to perform logical and control operations in such diverse areas as telephone switching systems and desk calculators. The recent widespread use of electronic data processing machines and related apparatus has made the systematic study of electronic switching or logic circuits a highly important area of scientific and engineering effort.

According to one classification, switching circuits are divided into two broad categories, combinational circuits and sequential circuits. Combinational circuits are those in which the output signals depend only upon the combination of input signals and not upon the past history or sequence of the input signals. Sequential circuits are those in which the output signals do depend upon the sequence of input signals. A sequential circuit, also referred to as a finite state machine, may be considered to be a combinational circuit with memory to record the circuit's past history. A more complete discussion of many of the aspects of combinational and sequential switching circuits can be found in any one of several well-known papers and books on switching circuits, such as, for example, D. C. Aufenkamp, and F. E. Hohn, "Analysis of Sequential Machines," *IRE Transactions on Electronic Computers*, EC-6, pp. 276–285, December, 1957; D. A. Huffman, "The Synthesis of Sequential Switching Circuits," J. Franklin Institute, 257:161–190, March, 1954; M. Phister, Jr., *Logical Design of Digital Computers, John Wiley & Sons, Inc., New York*, 1958; M. P. Marcus, *Switching Circuits for Engineers*, Prentice-Hall, Inc., New Jersey, 1967; R. E. Miller, "Switching Theory," Vol. I, *Combinational Circuits* (Vol. II *Sequential Circuits*), John Wiley & Sons, Inc., New York, 1965; W. S. Humphrey, *Switching Circuits*, McGraw-Hill, New York, 1958; and S. H. Caldwell, *Switching Circuits and Logic Design*, Wiley, New York, 1958.

Recently developed manufacturing techniques make possible the economical simultaneous production of a large number of integrated circuit semiconductor devices. These so-called batch-fabrication techniques make possible the simultaneous manufacture of the many devices necessary to realize many complicated switching circuit arrangements. Further, these techniques allow the interconnection of the devices to be made at the time of manufacture; that is, no extensive hand or machine interconnection of the separate logic devices is required. It is most desirable in many cases that the individual device or small combination of devices be identical, thereby simplifying the manufacturing process. When this is possible, and the combinations of devices (cells or modules) are arranged in regular arrays, the results are often referred to as microcellular arrays.

A review of microcellular techniques may be found in "A Survey of Microcellular Research," R. C. Minnick in *Journal of the Association for Computing Machinery*, Vol. 14, No. 2, Apr. 1967, pp. 203–241. Based on this study, it is clear, as the author explicitly states, that there is a long-felt need for development in the area of multiple-function programmable arrays suitable for integrated circuit batch-fabrication techniques.

Other aspects of logical arrays are described in F. C. Hennie, *Iterative Arrays of Logical Circuits*, MIT Press, 1961. An important improvement in the switching array art appears in U.S. Pat. No. 3,619,583 issued Nov. 9, 1971, to T. F. Arnold and assigned to the assignee of the instant application. Other developments appear in U.S. Pat. No. 3,473,160 issued Oct. 14, 1969, to S. E. Wahlstrom.

An important limitation in many prior art logic array configurations has been the need for complicated interconnections between the individual modules in logic arrays. U.S. Pat. No. 3,579,119 issued May 18, 1971, to S. S. Yau and C. K. Tang presents one attempt to simplify interconnections in a logic array. This interconnection problem is, of course, not peculiar to iterative logic arrays. Apparatus and methods for minimizing the complexity of interconnection on integrated circuit substrates in general are described, for example, in U.S. Pat. No. 3,621,208 issued Nov. 16, 1971, to D. D. Isett, J. A. Haliver and H. W. Von Beek. Such techniques as are described in these patents are, however, not universally applicable to logic circuit array structures.

It is therefore an object of the present invention to provide improved methods and apparatus for realizing logic circuit arrays capable of generating an arbitrary sequential function of a set of input variables.

It is another object of the present invention to provide simplified apparatus for realizing a logic array on an integrated circuit substrate including a plurality of logic circuits and means for selectively interconnecting these circuits.

It is still another object of the present invention to interconnect on an integrated circuit substrate a plurality of substantially identical logic circuit elements in such manner as to eliminate crossovers while realizing a logic array capable of generating an arbitrary sequential function of a plurality of input variables.

SUMMARY OF THE INVENTION

The above and other objects are realized in an illustrative embodiment of the present invention wherein basic logic modules are arranged in a columnar arrangement to form "stages." The individual stages are then interconnected to form an ordered, e.g., left-to-right, sequence of stages. This arrangement of stages, each containing a column of modules, is seen to constitute a two-dimensional array. In the case of a sequential logic circuit, the input variable $x$ is applied to all stages of the array and each stage introduces a unit of delay. Hence, the input variable $x$ can be viewed as $i$ input variables, $x_i$, $i = 0, 1, 2, \ldots, N$ each conveniently assigned to a respective stage in the array. By factoring the required output function into a function of $x_i$ and its complement, $x'_i$ for each $i$, the factors (as a function of the variables $x_{i-1}, x_{i-2}, \ldots, x_0$) required as input functions at the ith stage are uniquely identified. By grouping modules at the ith stage which require these input functions and by providing a fanout capability at the $k + h$ module in the $(i-1)$th stage sufficient to drive the $(k-1)$th, kth and $(k+1)$th modules in the ith stage, the need for crossovers in interconnection paths is eliminated. When the number of modules at the ith stage which require a given input function exceeds 3 (or in some cases, a higher number) the module at the $(i-1)$th stage which generates the given input function is replicated and positioned in the $(i-1)$th stage adjacent a group (or groups) in the ith stage requiring that input function.

The required interconnection pattern for any given function of a set of input variables is determined by a well-defined analysis readily performed in a programmed digital computer or by hand. The actual interconnection paths are conveniently generated, for example, in an integrated electronics context by well-known photolithographic techniques in response to information derived from this analysis.

DETAILED DESCRIPTION

The detailed descriprion of the present invention will be treated largely by way of example. However, to set an appropriate reference frame, an initial discussion of the more general aspects of the invention will be presented first.

Figure 1:
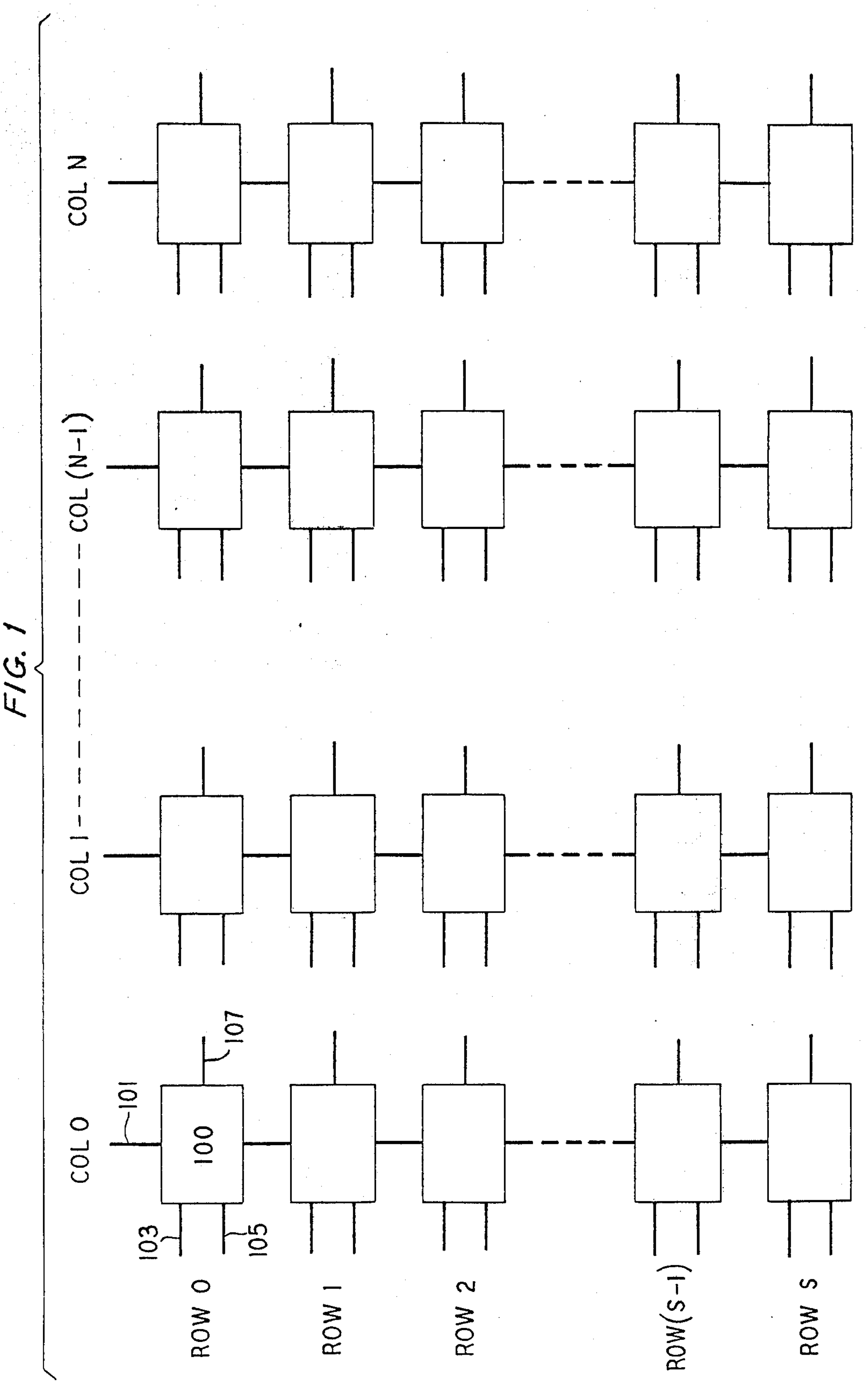
FIG. 1 illustrates the overall arrangement of an array of logic modules in accordance with the instant invention.

FIG. 1 is a representation of the basic array configuration for realizing an arbitrary switching function in accordance with the present invention. It is seen that a plurality of substantially identical circuit modules is arranged in a two-dimensional rectangular array. As illustrated in FIG. 1, there are a total of $N + 1$ columns in the array and a total of $S + 1$ rows in the array, where S and N are positive integers. Each of the logic modules in the array of FIG. 1 is arranged to have, in a typical embodiment, three input terminals, two at the left-hand edge of the module, and one at the top of the module, and one output terminal at the right of the logic module. For example, module 100 at the upper left-hand corner of the array of FIG. 1 includes input terminals 101, 103 and 105 and output terminal 107. The lead emanating from the lower portion of the blocks representing the logic modules is a continuation of the lead appearing at the top of the logic module. That is, provision is made to feed through the input leads appearing at the top of the modules in row 1 of each column to each of the succeeding (lower) logic modules in respective columns.

The configuration depicted in FIG. 1 is, of course, incomplete in that no interconnection is provided between the modules in the respective columns. Indeed, it is one object of the present invention to provide a simple and convenient method for interconnecting the modules. It can be seen that what appears to be the most straightforward interconnection pattern may not yield the desirable pattern having no crossovers among the interconnecting leads. Thus, for example, if it were desired to connect the module appearing at row 2, column 0, in FIG. 1 to one of the inputs of the module appearing at row 0, column 1, a distinct possibility of a crossover might exist if the output from the module at row 1, column 0, were required to be connected to one of the inputs of the module appearing at row 1, column 1. In the detailed description to follow, it will become apparent, in accordance with the present invention, how such a crossover can be avoided.

In a typical circuit embodiment of the present invention, each of the inputs at the top of the respective columns will be associated with an input variable. The desired outputs will appear on the output leads of the modules in column N. The inputs appearing at the left of FIG. 1, i.e., the inputs to the modules in column 0, are typically arranged to have impressed on them constant-valued functions. As will appear in the description below, not all leads nor all modules are necessarily used in realizing a given output function of a set of input variables.

Figure 2:
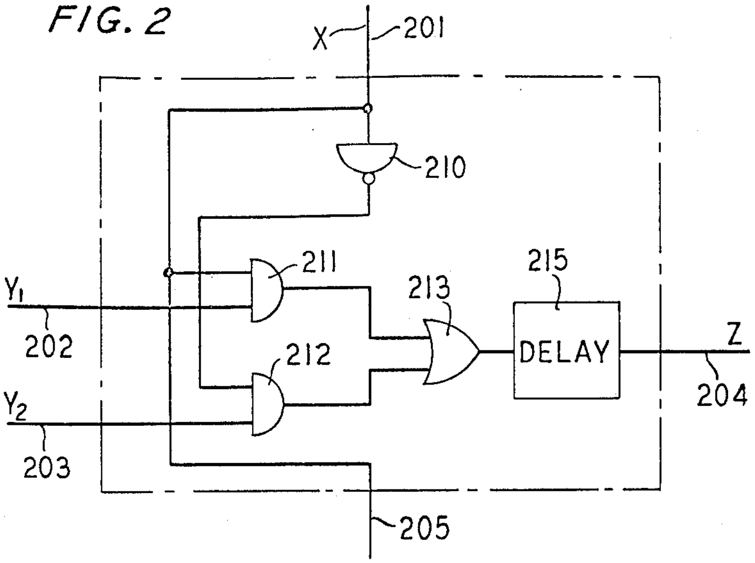
FIG. 2 shows a typical logic module which may be used in the array of FIG. 1 in accordance with the instant invention.

FIG. 2 is a schematic diagram representation of a typical module which may be used in the array configuration shown in FIG. 1. as was indicated above, there are three input leads to the modules. These are represented in FIG. 2 by the designations 201, 202, and 203. The output leads for the module shown in FIG. 2 are designated 204 and 205. It should be recognized, of course, that lead 205 is in actuality a continuation of input lead 201. Thus, in effect, the lead 201 is an input connection to a bus. Also shown in FIG. 2 are AND gates 211 and 212. Circuit element 213 is an OR circuit. Circuit element 210 shown in the form of a NAND gate is seen to have but a single input. It therefore functions as an inverter circuit. Lastly, element 215 is a delay circuit for storing the output from OR circuit 213. Each of these elements is of standard design and each is typically implemented in the form of an integrated circuit chip or some portion thereof. The interconnecting leads appearing within the dotted block in FIG. 2 are also typically generated in accordance with standard semiconductor integrated circuit technology.

If an input variable X is associated with the input lead 201 at time $t$ and input variables $Y_1$ and $Y_2$ are associated with the input leads 202 and 203, respectively, at time $t$, then the output function at time $(t+1)$ appearing on lead 204 and designated Z is seen to be representable by the logical equation $$Z = Y_1 X + Y_2 X',$$

where $(t+1)$ is the delay interval of element 215.

The manner in which the circuit in FIG. 2 realizes the above function should be readily apparent. However, for the sake of completeness, the operation of this circuit will be traced. The quantity X appearing on lead 201 at time $t$ is applied to AND gate 211 where it is ANDed with the $Y_1$ signal appearing on lead 202 at time $t$. The NAND gate 210 is seen to generate from the X input the complement signal X'. X' is then applied to AND gate 212 where it is ANDed with the $Y_2$ signal appearing on lead 203. The outputs from the two AND gates 211 and 212 are then ORed in OR circuit 213. Delay unit 215 delays the output for one interval such that the output Z appears on lead 204 at time $t+1$.

The number of rows and columns to be used in implementing an actual circuit will vary when using the general configuration shown in FIG. 1 in accordance with the present invention. For sequential circuits using modules of the type shown, the amount of memory required to specify the input variable will usually dictate the number of columns (stages), and the number of output variables will provide a minimum for the number of rows.

An example will now be given to illustrate one important class of embodiments of the present invention and the manner of constructing them. Specifically, a sequential circuit without feedback will be derived which generates as outputs a number of binary signals having a specified functional relation to values assumed by a plurality of binary input signals.

Figures 3, 4, 5, 7, 8:
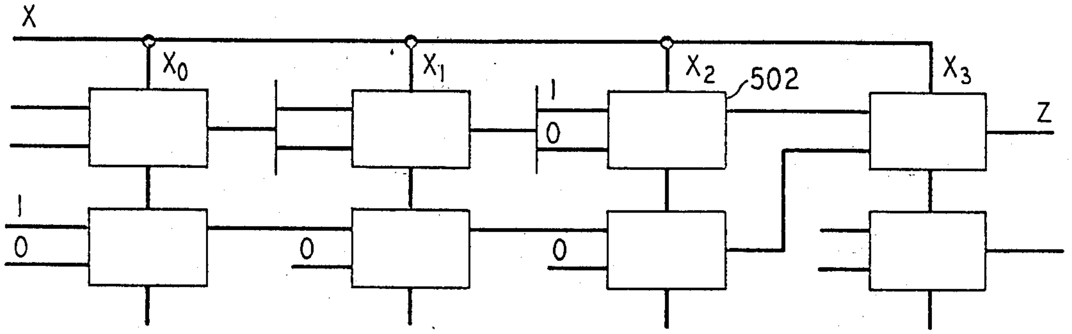
FIG. 3 shows a flow table for an illustrative sequential switching circuit without feedback in accordance with the present invention.
FIG. 4 shows an informational flow table derived from the flow table of FIG. 3.
FIG. 5 shows the circuit in accordance with the preferred embodiment of the present invention defined by the tables of FIGS. 3 and 4.
FIG. 7 illustrates a flow table for a sequential circuit with feedback in accordance with the present invention.
FIG. 8 shows an informational flow table derived from the flow table of FIG. 7.

A convenient tool, well known to practitioners in the switching circuits art for describing the desired behavior of a sequential circuit is the flow table. FIG. 3 shows such a flow table. Although it will be apparent to those skilled in the art how to interpret the flow table of FIG. 3, a brief explanation is considered appropriate.

Observe that the leftmost column includes numbers 1 through 5, in order from top to bottom. Starting with the row including 1 in the leftmost column, entires in the table are read as follows:

When the circuit is in present state 1 (1 in the leftmost column) and the input variable X is O, the output variable Z is 0 and the next state of the circuit is 2. Correspondingly, when the circuit is in the present state 1 and the input variable X is 1, the output variable is 0 and the next state of the circuit is 1; that is, the state of the circuit remains unchanged.

Consider now the row including a 2 in the leftmost column. The entries in this row indicate that when the circuit is in state 2 and X is 0, Z is 0 and the next state is 3. Similarly, in this instance, if X is 1, the next state is 1.

The remaining entries in the flow table of FIG. 3 are interpreted in the same manner.

In accordance with well-known techniques for synthesizing sequential circuits, the flow table is reordered to form a so-called informational flow table. The informational flow table for the flow table of FIG. 3 is shown in FIG. 4. The informational flow table is constructed by initially considering the total subset of circuit states, in this case, [1, 2, 3, 4, 5]. Looking down the column for $X=0$, it is seen that when $X=0$ the circuit will next be in one of the states 2, 3, 4, 4 or 2. It is thus said that $X=0$ maps into the subset [2, 3, 4]. Notice that states entered more than once are not repeated in the mapping. In similar fashion, the input $X=1$ maps the total set into the subset [1, 5].

Continuing, the subsets mapped from the total subset will themselves be mapped. Thus, for $X=0$, the subset [2, 3, 4] maps into the subset [3, 4] and for $X=1$, into the subset [1, 5]. Similarly, for $X=0$, the subset [1, 5] (mapped from the total subset) maps into the subset [2] and for $X=1$ maps into the subset [1].

FIG. 4 illustrates the entries in the informational flow table, both those derived above and the remaining ones. It is noted that each mapping is denoted by a "block" designation in FIG. 4. Further, mapping is complete when all of the subsets in a block specify single states only.

From the informational flow table shown in FIG. 4, the following equation defining Z is readily deducible by application of straightforward Boolean algebra principles. Thus, $$Z = X_3' X_2' + X_3 X_2' X_1' X_0'. \quad (1)$$

The subscripts, of course, relate to the blocks bearing the same numeral designation in the informational flow table of FIG. 4. In turn, the blocks themselves represent timing intervals. For example, the circuit configuration for the informational flow table of FIG. 4 includes four stages. If $t_0$ is the time at which input signals are applied to the first stage of the four-stage circuit and each stage adds one unit of delay, Z will appear at the output of the circuit at time $t_0+4$. Hence, equation (1) above is understood to be $$Z_{t_0+4} = x_{t_0'+3}\, x_{t_0'+2} + x_{t_0+3} x_{t_0'+2}\, x_{t_0'+1}\, x_{t_0}',$$

in more compact notation.

It proves convenient to analyze the signals at the input and output of each stage starting with the last stage first. Z is, of course, the output of the last, or fourth, stage of the circuit under construction. The input to each stage is then specified as follows:

$Y_{ij} = f_{ij0} X_i' + f_{ij1} X_i$,
$i = 3, 2, 1, 0$
and $j = 1, 2 \ldots n$ where $n$ is the number of outputs from the preceding stage.

For the last stage of the circuit under consideration, $n=1$ and $i=3$. Thus, $j=1$ and $$Y_{31} = f_{310} X_3' + f_{311} X_3.$$

From equation (1), it is apparent that, $f_{310} = X_2' = F_{31}$
$f_{311} = X_2' X_1' X_0' = F_{32}$.

The inputs to the last stage (which are the outputs from the next-to-last stage) are designated $F_{ik}$, $k = 1, 2 \ldots$, for convenience. Since there are two outputs from the third stage, $n=2$. Proceeding, then, for $j=1$, $$Y_{21} = f_{210} X_2' + f_{211} X_2.$$

From equation (1), it is seen that, $f_{210} = 1$,
$f_{211} = 0$.

Also, for $j=2$, $$Y_{22} = f_{220}\, X_2' + f_{221}\, X_2$$

and $$f_{220} = X_1'\, X_0' = F_{21}$$
$$f_{221} = 0.$$

Notice that constant-valued inputs are not denoted by an $F_{ik}$ designation as will become clear from the following discussion.

Again, there is but a single output from the second stage; hence $n = 1$. Consequently, for $j = 1$, $$Y_{11} = f_{110}\, X_1' + f_{111}\, X_1$$

and
$f_{110} = X_0' = F_{11}$
$f_{111} = 0.$
Similarly, $$Y_{01} = f_{010}\, X_0' + f_{011}\, X_0$$

and
$f_{010} = 1$
$f_{011} = 0.$
The circuit for producing the output functions specified above is shown in FIG. 5. Since the constant-valued inputs to certain modules, such as 502 in FIG. 5 are not supplied by a module in the preceding column, no output from that column need generate that value; hence, no $F_{ik}$ output designation is applied to the constant-valued inputs.

The foregoing example illustrated the construction of a sequential switching circuit without feedback in accordance with the present invention.

As indicated above, the apparatus of the present invention is further arranged to permit the efficient application of duplicated input signals to multiple modules without incurring crossover problems. The above-discussed procedure for specifying rectangular arrays provides for the grouping and ordering of outputs from each stage. Thus grouped and ordered, it is then a relatively simple procedure to specify the most efficient interconnection of modules without involving crossovers.

In order to more completely illustrate the principles of the instant invention, a sequential circuit with feedback will be specified.

Figure 6:
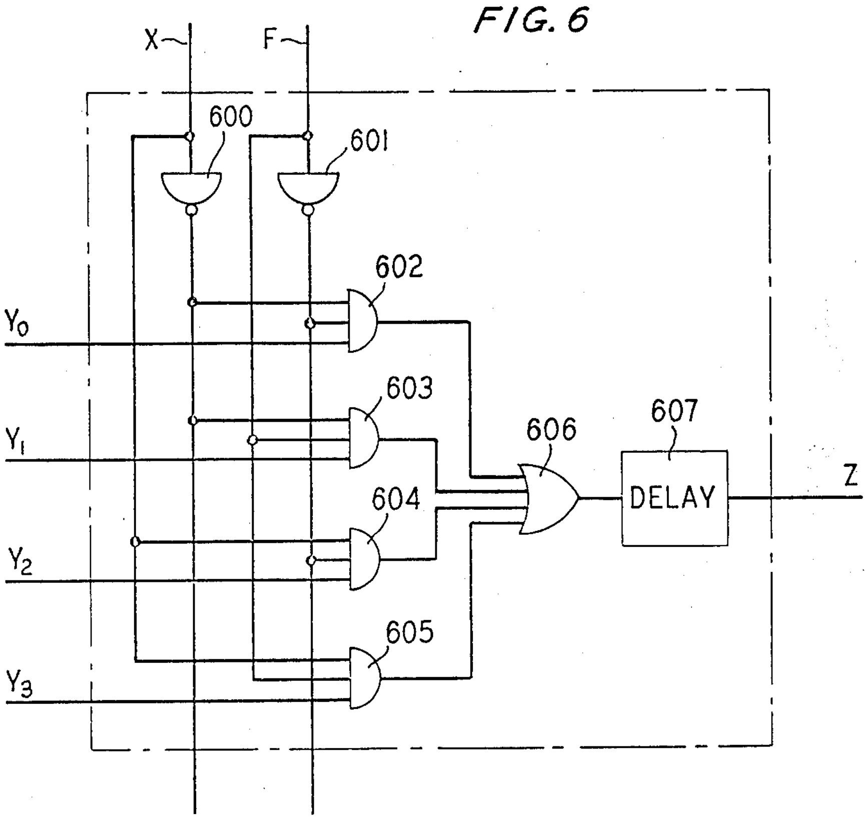
FIG. 6 shows a logic module useful in a sequential circuit with feedback constructed in accordance with the principles of the present invention.

FIG. 6 illustrates a typical module for use in a sequential circuit with feedback. As in the preceding module configuration, $X$, $F$, $Y_0$, $Y_1$, $Y_2$ and $Y_3$ are the input signals applied at time $t$ and Z is the output signal appearing at time $t + 1$. It is easily verified that the NAND gates 600, 601, and the AND gates 602–605, the OR gate 606 and the delay unit 607 of FIG. 6 are arranged to produce output signals corresponding to the relationship $$Z = Y_0\, F'\, X' + Y_1 F\, X' + Y_2 F' X + Y_3 F\, X.$$

The circuit to be developed as an example is described by means of the flow table of FIG. 7, the related informational flow table of FIG. 8 and the following equations representing the entries in those flow tables, as indicated in the discussion relating to equation (1) above, $$Z = F_2'\, X_2' + F_2'\, X_2\, F_1\, X_1' + F_2\, X_2'\, F_1'\, X_1' + F_2\, X_2'\, F_1\, X_1\, F_0\, X_0' + F_2\, X_2'\, F_1\, X_1'\, F_0\, X_0 + F_2\, X_2' F_1\, X_1 + F_2\, X_2\, F_1'\, X_1' + F_2\, X_2\, F_1'\, X_1\, F_0\, X_0' + F_2\, X_2\, F_1\, X_1'\, F_0\, X_0 \quad (2)$$

and $$F_3 = F_2'\, X_2' + F_2'\, X_2 + F_2\, X_2'\, F_1'\, X_1\, F_0\, X_0 + F_2\, X_2'\, F_1\, X_1'\, F_0'\, X_0 + F_2\, X_2'\, F_1\, X_1'\, F_0\, X_0' + F_2\, X_2'\, F_1\, X_1 + F_2\, X_2\, F_1'\, X_1' + F_2\, X_2\, F_1'\, X_1\, F_0\, X_0' + F_2\, X_2\, F_1\, X_1'\, F_0\, X_0. \quad (3)$$

As in the preceding example, it is understood that $X_q$ and $F_q$ are $x_{t_0}$ and $f_{t_0+q}$, respectively, where $q = 0, 1, 2, 3$, in this instance.

Initially, the function $Y_{ij}$ representing the input function to each stage of the configuration is specified as follows $$Y_{ij} = m_{ij0}\, F_i'\, X_i' + m_{ij1}\, F_i\, X_i' + m_{ij2}\, F_i'\, X_i + m_{ij3}\, F_i\, X_i$$

where $$i = s \ldots 2, 1, 0,$$

and $$j = 1, 2 \ldots n$$

where $n$ is the number of output signals from a stage and $s$ is the order of the highest ordered block of the information flow table representation of the array. For the information flow table of FIG. 8, $s = 2$. Thus, for $i = 2, j = 1$, the last stage producing the output function Z is defined by the relationship $$Z = Y_{21} = m_{210}\, F_2'\, X_2' + m_{211}\, F_2\, X_2' + m_{212}\, F_2'\, X_2 + m_{213}\, F_2\, X_2$$

and from equation (2) above, it is seen that,
$m_{210} = 1$
$m_{211} = F_1'\, X_1' + F_1'\, X_1\, F_0\, X_0' + F_1\, X_1'\, F_0\, X_0 + F_1\, X_1 = M_{21}$
$m_{212} = F_1\, X_1' = M_{22}$
$m_{213} = F_1'\, X_1' + F_1\, X_1\, F_0\, X_0' + F_1\, X_1'\, F_0\, X_0 = M_{23}.$
For the next-to-last stage, $n = 3$ and, hence, $j = 1, 2, 3$.

For reasons to become apparent in the subsequent discussion, each of the nonconstant-valued coefficients, $m_{211}$, $m_{212}$ and $m_{213}$ has been redesignated $M_{21}$, $M_{22}$ and $M_{23}$, respectively. In general, then, each of the nonconstant-valued $m_{ij}$ coefficients for a particular $Y_{ij}$ will be redesignated $M_{in}$, $n = 1, 2, 3$ in order from first to last. Proceeding with the analysis as above, for $i = 1$, $j = 1$:

$$Y_{11} = m_{110}\, F_1'\, X_1' + m_{111}\, F_1\, X_1' + m_{112}\, F_1'\, X_1 + m_{113}\, F_1\, X_1$$

from equation (2) it is clear that,
$m_{110} = 1$
$m_{111} = F_0\, X_0 = M_{11}$
$m_{112} = F_0\, X_0' = M_{12}$
$m_{113} = 1$
and for $i = 1, j = 2$
$Y_{12} = m_{120}\, F_1'\, X_1' + m_{121}\, F_1\, X_1' + m_{122}\, F_1'\, X_1 + m_{123}\, F_1\, X_1$
$m_{120} = 0$
$m_{121} = 1$
$m_{122} = 0$
$m_{123} = 0$
and for $i = 1, j = 3$
$Y_{13} = m_{130}\, F_1' X_1' + m_{131}\, F_1\, X_1' + m_{132} F_1'\, X_1 + m_{133}\, F_1\, X_1$
$m_{130} = 1$
$m_{131} = F_0\, X_0 = M_{13}$
$m_{132} = F_0\, X_0' = M_{14}$ $m_{133} = 0$ Again, as in the preceding example, no $M_{in}$ is assigned to constant-valued functions. Hence, there are $n = 4$ input functions to be generated by the zeroth stage of the array. Thus, for $i = 0, j = 1$, $$Y_{01} = m_{010} F_0' X_0' + m_{011} F_0 X_0' + m_{012} F_0' X_0 + m_{013} F_0 X_0$$

and from equation (2) it is again clear that, $m_{010} = 0$
$m_{011} = 0$
$m_{012} = 0$
$m_{013} = 1$ and for $i = 0, j = 2$ $Y_{02} = m_{020} F_0' X_0' + m_{021} F_0 X_0' + m_{022} F_0' X_0 + m_{023} F_0 X_0$,
$m_{020} = 0$
$m_{021} = 1$
$m_{022} = 0$
$m_{023} = 0$ and for $i = 0, j = 3$ $Y_{03} = m_{030} F_0' X_0' + m_{031} F_0 X_0' + m_{032} F_0' X_0 + m_{033} F_0 X_0$,
$m_{030} = 0$
$m_{031} = 0$
$m_{032} = 0$
$m_{030} = 1$ and lastly for $i = 0, j = 4$ $Y_{04} = m_{040} F_0' X_0' + m_{041} F_0 X_0' + m \quad F_0' X_0 + m_{043} F_0 X_0$,
$m_{040} = 0$
$m_{041} = 1$
$m_{042} = 0$
$m_{043} = 0$.

Proceeding with a similar analysis for the feedback function, the input to the last stage of the array for generating the function $F_3$, equation 3 above, is specified by $i = 2, n = 1, j = 1$ $$Y_{21} = p_{210} F_2' X_2' + p_{211} F_2 X_2' + p_{212} F_2' X_2 + p_{213} F_2 X_2.$$

$p_{ijo}$, $p_{ij1}$, $p_{ij2}$ and $p_{ij3}$ are the coefficients of the related $F_2X_2$ terms in the feedback equation (3) above. From equation (3) it is clear that, $p_{210} = 1$
$p_{211} = F_1' X_1 F_0 X_0 + F_1 X_1' F_0' X_0 + F_1 X_1' F_0 X_0' + F_1 X_1 = P_{21}$
$p_{212} = 1$
$p_{213} = F_1' X_1' + F_1' X_1 F_0 X_0' + F_1 X_1' F_0 X_0 = P_{22}$.

$P_{in}$ is assigned to each nonconstant function in similar fashion to the analysis relating to the output function Z. Then, for $i = 1, j = 1$ (omitting, for simplicity, the reiteration of each equation specifying $Y_{ij}$).

$P_{110} = 0$
$p_{111} = F_0' X_0 + F_0 X_0' = P_{11}$
$p_{112} = F_0 X_0 = P_{12}$
$p_{113} = 1$ and for $i = 1, j = 2$ $p_{120} = 1$
$p_{121} = F_0 X_0 = p_{13}$
$p_{122} = F_0 X_0' = P_{14}$
$p_{123} = 0$.

There are $n = 4$ input signals required by the first stage. These must be generated by the zeroth stage as follows: for $i = 0, j = 1$ $p_{010} = 0$
$p_{011} = 1$
$p_{012}$ 1
$p_{013} = 0$ and for $= 0, j = 2$ $p_{020} = 0$
$p_{021} = 0$
$p_{022} = 0$
$p_{023} = 1$ and for $i = 0, j = 3$ $p_{030} = 0$
$p_{031} = 0$
$p_{032} = 0$
$p_{033} = 1$ and for $i = 0, j = 4$ $p_{040} = 0$
$p_{041} = 1$
$p_{042} =$
$p_{043} = 0$.

At this point, it proves convenient to list the nonconstant output functions for each stage of the array. Thus, for the second stage (the third stage outputs are Z and $F_3$, it will be recalled), the outputs are as follows:

$M_{21} = F_1'X_1' + F_1'X_1F_0X_0' + F_1X_1'F_0X_0 + F_1X_1$
$M_{22} = F_1X_1'$
$M_{23} = F_1'X_1' + F_1'X_1'F_0X_0' + F_1 X_1'F_0X_0$
$P_{21} = F_1'X_1F_0X_0 + F_1X_1'F_0'X_0 + F_1X_1'F_0X_0' + F_1X_1$
$P_{22} = F_1'X_1' + F_1'X_1F_0X_0' + F_1X_1'F_0X_0$

Notice that the outputs for producing the function Z as well as those producing the feedback function F, are included since they are both generated by the same array.

Once the outputs of a stage are thus listed, they are inspected. If any two adjacent output functions are the same, the second of the two is deleted. This process is repeated until all duplications have been removed.

None of the outputs from the second stage is repeated. The outputs from the modules of stage 1 are then listed. Thus, $M_{11} = F_0 X_0$
$M_{12} = F_0 X_0'$
$M_{13} = F_0 X_0$
$M_{14} = F_0 X_0'$
$P_{11} = F_0' X_0 + F_0 X_0'$
$P_{12} = F_0 X_0$
$P_{13} = F_0 X_0$
$P_{14} = F_0 X_0'$ It is observed that $P_{12}$ and $P_{13}$ are identical. Therefore, the outputs are rewritten as follows:

$M_{11} = F_0 X_0$
$M_{12} = F_0 X_0'$
$M_{13} = F_0 X_0$
$M_{14} = F_0 X_0'$
$P_{11} = F_0' X_0 + F_0 X_0'$
$P_{12} = F_0 X_0$
$P_{14} = F_0 X_0'$

Figure 9:
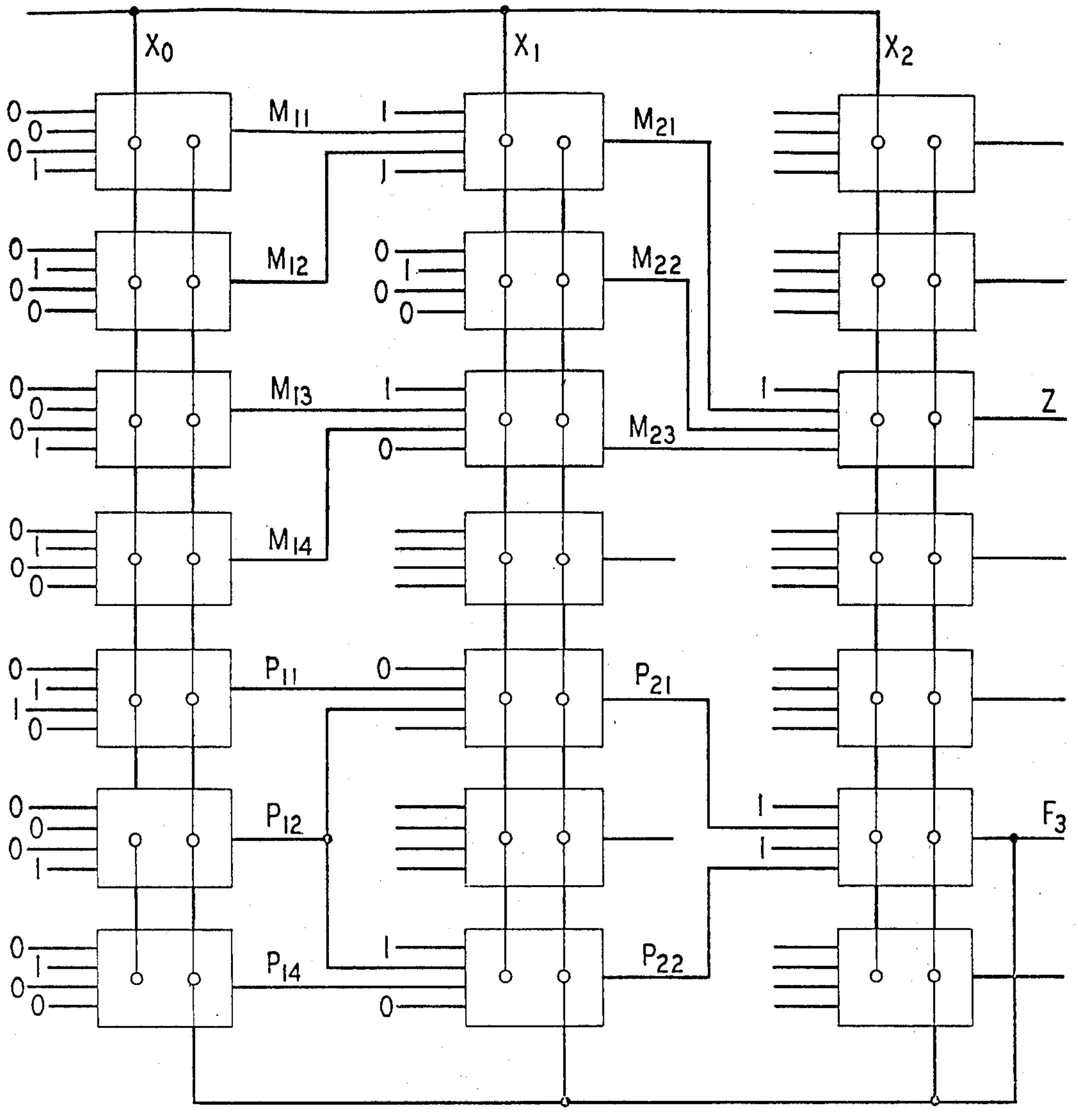
FIG. 9 illustrates the circuit in accordance with the present invention corresponding to the tables of FIGS. 7 and 8.

No other two adjacent output functions are the same. Consequently, no further simplifications can be made. The circuit for producing the above-specified functions is shown in FIG. 9.

The above-described problems, procedures and circuits should be understood to be merely typical. Thus, although the examples treated include particular numbers of inputs and outputs, the same teachings are obviously applicable to sequential logic circuits having an arbitrary number of inputs and outputs. It should also be understood that because the factoring and identification procedures used in determining the interconnection between modules in adjacent stages is very well defined that it will lend itself in appropriate cases to automation under program control in a digital computer. Thus, the procedure given above and the arrays resulting from these procedures in no way depend upon human intervention in the sense of providing subjective judgments.

Further, it should be understood that the modules shown in FIGS. 2 and 6 are merely typical. Other factorizations of the logic equations representing the desired logic functions will suggest other modules to be used. Similarly, other circuit elements for realizing the same logic function as that provided by the module shown in FIGS. 2 and 6 will occur to those skilled in the art. Extensions of the above-described techniques to other than binary logic functions are also immediate.

What is claimed is:

1. Apparatus for generating signals representing desired sequential logical functions $Z_j$, $j = 0, 1, 2 \ldots, (N_1-1)$ of one or more input logic variables $X_i$, $i = 0, 1, \ldots, (N_2-1)$ comprising a plurality of substantially identical logic modules arranged in a rectangular array having a plurality of ordered rows and a plurality of $N_2$ ordered columns, each of said logic modules comprising a plurality of input terminals, at least one output terminal, and circuit means including delay means for generating at said output terminal, signals representing a fixed sequential function of logic variables represented by signals applied at said input terminals, means for applying signals representing one or more of said input logic variables to selected modules in the first row of said array, said means for applying comprising means for applying signals representing the ith input logic variable to an input terminal of the module in the first row of the ith column, said apparatus further comprising means for extending the application of said signals representing the ith one of said variable to an input terminal of each module in said ith column, connecting means interconnecting selected ones of said modules appearing in a given column, other than the last, to modules appearing in the immediately succeeding column, said connecting means extending from a given module in said given column only to selected ones of the set of modules in said succeeding column which set includes the module in the same row as said given module and those in consecutive adjacent rows, said circuit means in each of said logic modules comprising means for generating at time $t+1$ the fixed function, $$f_{ij0}\, X_i' + f_{ij1}\, X_i,$$

where $X_i$ is the input variable X applied to the ith column of the array, $X_i'$ is the complement of $X_i$, and $f_{ij0}$ and $f_{ij1}$ are the logical functions of one or more of the input variables other than $X_0$ each applied at time $t$, and output means connected to selected ones of the modules in the last column of said array, said output means comprising $N_1$ ordered output leads each connected to an output terminal of a respective one of said selected modules in the last column of said array, each of said output leads corresponding to one of said desired logical functions, and wherein at least one of said output leads is connected to an input terminal in each of the modules in the first row of said array.

2. Apparatus according to claim 1 wherein said connecting means further comprises means for connecting input terminals of the modules in the ith column to the output terminals of those of the modules in the (i—1)th column which contribute signals representing factors $f_{(i-1)j0}$ and $f_{(i-1)j1}$ which are expressible in terms of $X_0, X_1 \ldots, X_{i-1}$ and which satisfy $$X_{ij} = f_{(i-1)j0}\, X_i' + f_{(i-1)j1}\, X_i$$

where $Y_{ij}$ is a function of $X_0, X_1 \ldots, X_{i-1}$ contributing to the desired function $Z_j$.

3. Apparatus for generating signals representing desired sequential logical functions $Z_j$, $j = 0, 1, 2 \ldots, (N_1-1)$ of one or more input logic variables $X_i$, $i = 0, 1, \ldots, (N_2-1)$ comprising a plurality of substantially identical logic modules arranged in a rectangular array having a plurality of $N_1$ ordered rows and a plurality of $N_2$ ordered columns, means for applying signals representing one or more of said input logic variables to selected modules in the first row of said array, connecting means interconnecting selected ones of said modules appearing in a given column, other than the last, to modules appearing in the immediately succeeding column, said connecting means extending from a given module in said given column only to selected ones of the set of modules in said succeeding column which set includes the module in the same row as said given module and those in consecutive adjacent rows, and output means connected to selected ones of the modules in the last column of said array, said output means comprising $N_1$ ordered output leads each connected to an output terminal of a respective one of said selected modules in the last column of said array, each of said output leads corresponding to one of said desired logical functions, wherein at least one of said output leads is connected to an input terminal in each of the modules in the $(N_1)$th row of said array.

4. Apparatus for generating signals representing desired sequential logical functions $Z_j$, $j = 0, 1, 2, \ldots, (N_1-1)$ of one or more input logic variables $X_i$, $i = 0, 1, \ldots, (N_2-1)$ comprising a plurality of substantially identical logic modules arranged in a rectangular array having a plurality of ordered rows and a plurality of ordered columns, means for applying signals representing one or more of said input logic variables to selected modules in the first row of said array, connecting means interconnecting selected ones of said modules appearing in a given column, other than the last, to modules appearing in the immediately succeeding column, said connecting means extending from a given module in said given column only to selected ones of the set of modules in said succeeding column which set includes the module in the same row as said given module and those in consecutive adjacent rows, and said connecting means comprising means for connecting the input terminals of the jth one of said selected modules in the $(N_2-1)$th column in said array to the output terminals of those of said modules in the $(N_2-2)$th column which generate $f_{(N-1)j0}$ and $f_{(N-1)jl}$ as outputs, $f_{(N-1)j0}$ and $f_{(N292-1)j1}$ being the factors expressable in terms of $X_0, X_1 \ldots, X_{N-2}$ which satisfy $$Z_j = f_{(N-1)j0} X'_{N-1} + f_{(N-1)j1} X_{N-1}, \text{ and}$$

output means connected to selected ones of the modules in the last column of said array, said array comprising at least $N_1$ rows, each of said modules comprising a single output terminal, and signals representing the jth one of said desired logical functions appearing on the lead connected to the output terminal of the jth one of said selected modules in the last column of said array.

* * * * *